United States Patent
Xu et al.

(10) Patent No.: US 12,074,472 B2
(45) Date of Patent: Aug. 27, 2024

(54) OFFLINE UNINTERRUPTIBLE POWER SUPPLIES (UPSS) AND RELATED DESIGN OF ENERGY (DOE) MODE FAILURE DETECTION METHODS

(71) Applicant: Eaton Intelligent Power Limited, Dublin (IE)

(72) Inventors: Heyi Xu, Shenzhen (CN); Kaixin Chen, Shenzhen (CN)

(73) Assignee: Eaton Intelligent Power Limited, Dublin (IE)

( * ) Notice: Subject to any disclaimer, the term of this patent is extended or adjusted under 35 U.S.C. 154(b) by 3 days.

(21) Appl. No.: 18/186,611

(22) Filed: Mar. 20, 2023

(65) Prior Publication Data
US 2023/0307944 A1    Sep. 28, 2023

(30) Foreign Application Priority Data
Mar. 22, 2022    (CN) .......................... 202210284627.9

(51) Int. Cl.
*H02J 9/06*    (2006.01)
*H02J 7/00*    (2006.01)

(52) U.S. Cl.
CPC ............ *H02J 9/062* (2013.01); *H02J 7/0068* (2013.01); *H02J 9/068* (2020.01)

(58) Field of Classification Search
CPC ............ H02J 9/062; H02J 7/0068; H02J 9/068
See application file for complete search history.

(56) References Cited

U.S. PATENT DOCUMENTS

2022/0231535 A1*    7/2022  Hu ............................ H02J 7/02

\* cited by examiner

*Primary Examiner* — Daniel Cavallari
(74) *Attorney, Agent, or Firm* — Stanek Lemon Crouse Meeks, PA

(57) ABSTRACT

An offline uninterruptible power supply (UPS) is provided, including: a transformer, configured to output a utility power voltage to a load; a bidirectional converter, configured to convert alternating current from the transformer into direct current to charge a rechargeable battery, and convert direct current from the rechargeable battery into alternating current to be outputted to the transformer; and a control unit, configured to control operation of the offline UPS, where when the utility power voltage is within a normal range and the rechargeable battery is fully charged, the offline UPS enters a design of energy (DOE) mode, in the DOE mode, the transformer and the bidirectional converter are turned off, and in the DOE mode, the control unit is configured to detect a voltage of the rechargeable battery, and calculate a slope of decrease in the voltage of the rechargeable battery, and when the slope of decrease in the voltage is greater than a preset first threshold, the control unit controls the offline UPS to delete the DOE mode.

10 Claims, 4 Drawing Sheets

OFFLINE UNINTERRUPTIBLE POWER SUPPLIES (UPSS) AND RELATED DESIGN OF ENERGY (DOE) MODE FAILURE DETECTION METHODS

CROSS-REFERENCE TO RELATED APPLICATIONS

The present application claims priority to Chinese Application No. 202210284627.9 filed Mar. 22, 2022, entitled AN OFFLINE UNINTERRUPTIBLE POWER SUPPLY AND DOE MODE FAILURE DETECTION METHOD, the disclosure of which is hereby incorporated herein by reference as if set forth in its entirety.

TECHNICAL FIELD

The present disclosure relates to the field of uninterruptible power supplies (UPSs), and in particular, to an offline UPS and a design of energy (DOE) mode failure quick detection method.

BACKGROUND

Currently, the market imposes higher market access requirements for efficiency indicators of offline UPSs. Conventionally designed offline UPSs usually cannot satisfy this new indicator requirement, and therefore DOE design is required for offline UPSs.

SUMMARY

According to the foregoing problems in the prior art, the present disclosure provides an offline UPS, including:
  a transformer, configured to output a utility power voltage to a load;
  a bidirectional converter, configured to convert alternating current from the transformer into direct current to charge a rechargeable battery, and convert direct current from the rechargeable battery into alternating current to be outputted to the transformer; and
  a control unit, configured to control operation of the offline UPS,
  where in response to the utility power voltage being within a normal range and the rechargeable battery being fully charged, the offline UPS enters a DOE mode, in the DOE mode, the transformer and the bidirectional converter are turned off, and
  in the DOE mode, the control unit is configured to detect a voltage of the rechargeable battery, and calculate a slope of decrease in the voltage of the rechargeable battery, and in response to the slope of decrease in the voltage being greater than a preset first threshold, the control unit controls the offline UPS to delete the DOE mode.

In one embodiment, the offline UPS further includes:
  an AC/DC converter, configured to convert the utility power voltage into direct current to supply power to the control unit in the DOE mode.

In one embodiment, the offline UPS further includes the rechargeable battery.

In one embodiment, the transformer further includes a control component, and in response to the utility power voltage deviating from a normal value, different taps of the transformer are controlled by the control component to be connected or disconnected, to implement a constant voltage outputted to the load.

In one embodiment, the control unit is further configured to detect the voltage of the rechargeable battery, and in response to the voltage of the rechargeable battery being less than a preset second threshold, the control unit controls the offline UPS to delete the DOE mode.

The present disclosure further provides a DOE mode failure detection method for an offline UPS, the offline UPS having a DOE mode, the method including:
  in response to a control unit detecting that the offline UPS is in the DOE mode, detecting, by the control unit, whether a slope of decrease in a voltage of a rechargeable battery is greater than a preset first threshold; and
  in response to the slope of decrease in the voltage of the rechargeable battery being greater than the preset first threshold, controlling, by the control unit, the offline UPS to delete the DOE mode.

In one embodiment, in response to the offline UPS entering the DOE mode, a DOE mode flag bit stored in a memory is set, and the control unit detects a value of the DOE mode flag bit stored in the memory to determine whether the offline UPS is in the DOE mode.

In one embodiment, the step of deleting the DOE mode by the offline UPS includes:
  controlling, by the control unit, to turn on a transformer and a bidirectional converter in the offline UPS, turn off an AC/DC converter, disable a DOE function, and save a DOE mode failure in a historical record.

In one embodiment, the method further includes:
  after the offline UPS is powered off or powered up again, enabling the DOE function again.

In one embodiment, the method further includes:
  in response to the slope of decrease in the voltage of the rechargeable battery being greater than the preset first threshold, calibrating a standby duration of the rechargeable battery again.

For a DOE mode of an offline UPS, the present disclosure provides a DOE mode failure quick detection method. In the DOE mode, a control unit detects in real time whether a slope of decrease in a voltage of a rechargeable battery is greater than a preset slope threshold. In response to the slope of decrease in the voltage of the rechargeable battery being greater than the preset slope threshold, the control unit controls the offline UPS to delete the DOE mode, to avoid an electric energy loss of the rechargeable battery. The method does not require an additional hardware circuit, requires low costs, and can quickly detect a DOE mode failure, to provide a reliable standby duration for a backstage load.

DETAILED DESCRIPTION

To make the objectives, technical solutions, and advantages of the present disclosure more comprehensible, the present disclosure is further described below in detail with reference to the accompanying drawings and specific embodiments. It should be understood that the specific embodiments described herein are merely used to describe the present disclosure rather than limiting the scope of the present disclosure.

Figure 1:
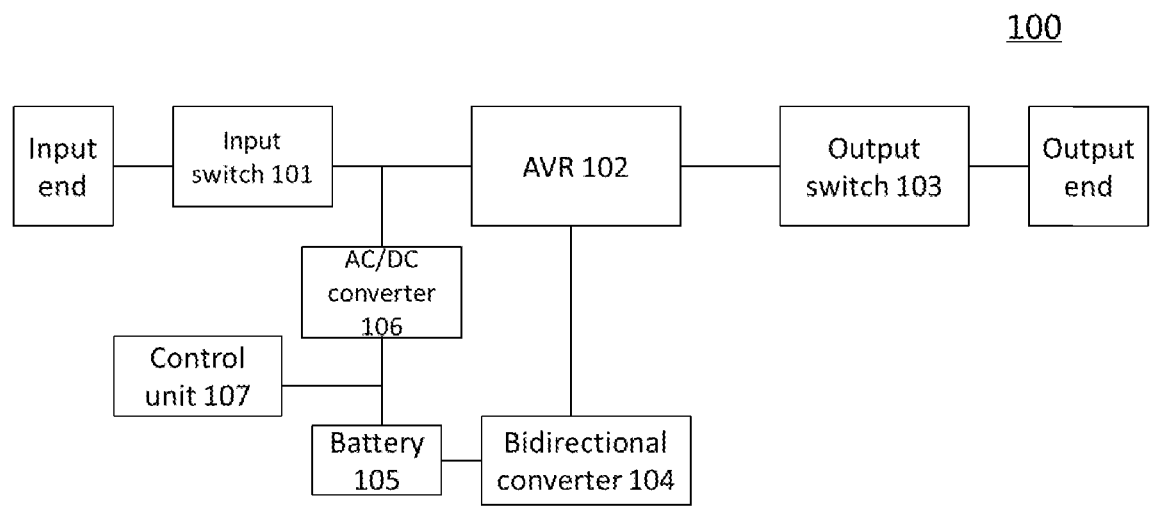
FIG. 1 is a circuit block diagram of an offline UPS according to an embodiment of the present disclosure.

FIG. 1 is a circuit block diagram of an offline uninterruptible power supply (UPS) according to an embodiment of the present disclosure. As shown in FIG. 1, an offline UPS 100 includes an input switch 101, an automatic voltage regulator (AVR) 102, an output switch 103, a bidirectional converter 104, a rechargeable battery 105, an AC/DC converter 106, and a control unit 107. An input end is configured to be connected to utility power, and an output end is configured to be connected to a load. The AVR 102 includes a transformer and a control component (for example, a switch), and is configured to regulate an output voltage. When an input voltage deviates from a normal value, the control component in the AVR 102 controls different taps of the transformer to be connected or disconnected, to implement a constant output voltage. The AVR 102 further supplies alternating current to the bidirectional converter 104. The bidirectional converter 104 converts the alternating current into direct current to charge the rechargeable battery 105. The rechargeable battery 105 may convert direct current into alternating current through the bidirectional converter 104 to supply power to the load at the output end. The bidirectional converter 104 may be a bidirectional full-bridge converter. The control unit 107 is configured to control the components in the offline UPS 100, to ensure the normal operation of the offline UPS 100. The control unit 107 may be powered by one of the AC/DC converter 106, the rechargeable battery 105, and the bidirectional converter 104. The AC/DC converter 106 is configured to convert alternating current from the input end into direct current to supply power to the control unit 107. The AC/DC converter 106 may be a flyback or forward architecture circuit.

When the utility power voltage is within a normal range, the offline UPS 100 is controlled to be in a normal mode. After the rechargeable battery 105 is fully charged, the offline UPS may enter a DOE mode, that is, the AVR 102 and the bidirectional converter 104 are turned off, to improve the overall efficiency. In this case, the AC/DC converter 106 supplies power to the control unit 107.

Figure 2:
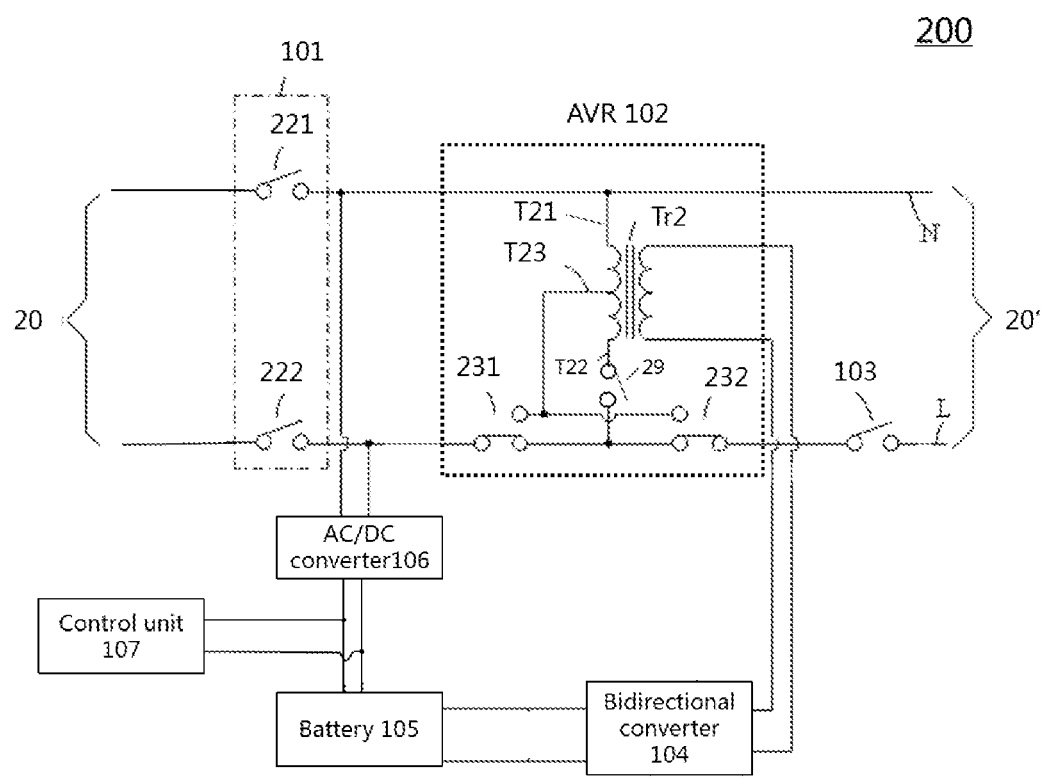
FIG. 2 is a circuit topology diagram of an offline UPS according to an embodiment of the present disclosure.

FIG. 2 is a circuit topology diagram of an offline UPS according to an embodiment of the present disclosure, and shows a specific structure of the AVR 102. It should be noted that the structure of the AVR 102 is only an example and does not constitute a limitation to the present disclosure. The operating mode of the offline UPS of the present disclosure is further described below in detail with reference to FIG. 2. As shown in FIG. 2, an offline UPS 200 includes: an input switch (safety switch) 101, connected between an alternating current input end 20 and an alternating current output end 20' thereof, and constructed to be a double-pole single-throw relay or include a safety switch unit 221 and a safety switch unit 222; a first switch 231, a second switch 232, and an output switch 103 that are sequentially connected between the safety switch 101 and a terminal L of the alternating current output end 20'; a transformer Tr2, a terminal T21 on a primary side of the transformer Tr2 being connected between the safety switch 101 and a terminal N of the alternating current output end 20', where the first switch 231 operably connects the safety switch 101 to one of another terminal T22 and a tap T23 on the primary side of the transformer Tr2, and the second switch 232 operably connects the output switch 103 to one of another terminal T22 and the tap T23 on the primary side of the transformer Tr2; a rechargeable battery 105; a bidirectional converter 104; an AC/DC converter 106; and a control unit 107.

The rechargeable battery 105 is connected to a secondary side of the transformer Tr2 via the bidirectional converter 104. The control unit 107 is connected to the rechargeable battery 105. The rechargeable battery 105 supplies power to the control unit 107 in a battery mode. The control unit 107 is further configured to control operation of the offline UPS 200, for example, is configured to control operating status of the AVR 102, the AC/DC converter 106, the rechargeable battery 105, and the bidirectional converter 104, and control ON/OFF status of the safety switch 101, the first switch 231, the second switch 232, a third switch 29, and the output switch 103 (for clarity, corresponding connecting wires are not shown). Input terminals of the AC/DC converter 106 are connected to the alternating current input end 20 via the safety switch 101. That is, one terminal of the input terminals of the AC/DC converter 102 is connected between the first safety switch unit 221 and one terminal N of the alternating current output end 20', and another terminal of the input terminals of the AC/DC converter 102 is connected between the second safety switch unit 222 and the first switch 231. The output terminals of the AC/DC converter 106 are connected to the control unit 107 to supply power to the control unit 107 in a DOE mode.

The operating modes of the offline UPS 200 are described below in different cases.

(1) When the utility power voltage is within a normal range, the offline UPS 200 is controlled to be in a normal mode. The safety switch 101 (that is, the first safety switch unit 221 and the second safety switch unit 222) is controlled to be turned on. If the rechargeable battery 105 has not been fully charged, the third switch 29 is controlled to be turned on (that is, the third switch 29 is connected to a node between the first switch 231 and the second switch 232). The first switch 231 and the second switch 232 are both controlled to be connected to the terminal T22 on the primary side of the transformer Tr2, and the output switch 103 is controlled to be turned on. Alternating current of the alternating current input end 20 is transferred to the alternating current output end 20'. In addition, the bidirectional converter 104 is controlled to convert alternating current on the secondary side of the transformer Tr2 into direct current, to quickly charge the rechargeable battery 105. In this case, the control unit 107 controls the AC/DC converter 106 not to work, and the control unit 107 acquires power from the bidirectional converter 104.

If the rechargeable battery 105 has been fully charged, in this case, the third switch 29 is controlled to be turned off, and the AVR 102 and the bidirectional converter 104 are turned off. In this case, the offline UPS 200 operates in the DOE mode. In addition, the AC/DC converter 106 is controlled to convert alternating current of the alternating current input end 20 into direct current, to supply required direct current to the control unit 107. In the DOE mode, the primary side of the transformer Tr2 is not connected to the circuit, and therefore a no-load loss of the transformer does not exist. The bidirectional converter 104 stops working, so that the loss is reduced, and the overall efficiency is improved.

(2) When the utility power voltage is slightly high, the offline UPS 200 is controlled to be in an automatic voltage decrease regulation mode. Wherein, the safety switch 101 is controlled to be turned on, the third switch 29 is controlled to be turned on, the first switch 231 is controlled to be connected to the terminal T22 on the primary side of the transformer Tr2, the second switch 232 is controlled to be connected to the tap T23 on the primary side of the transformer Tr2, and the output switch 103 is controlled to be turned on. The control unit 107 controls the AC/DC converter 106 not to work, and the control unit 107 acquires power from the bidirectional converter 104.

(3) When the utility power voltage is slightly low, the offline UPS 200 is controlled to be in an automatic voltage increase regulation mode. Wherein, the safety switch 101 is controlled to be turned on, the third switch 29 is controlled to be turned on, the first switch 231 is controlled to be connected to the tap T23 on the primary side of the transformer Tr2, the second switch 232 is controlled to be connected to the terminal T22 on the primary side of the transformer Tr2, and the output switch 103 is controlled to be turned on. The control unit 107 controls the AC/DC converter 106 not to work, and the control unit 107 acquires power from the bidirectional converter 104.

(4) When the utility power voltage is abnormal (for example, the voltage is excessively high) or a power failure occurs, the offline UPS 200 is controlled to be in the battery mode. Wherein, the safety switch 101 is controlled to be turned off, the second switch 232 is controlled to be connected to the terminal T22 on the primary side of the transformer Tr2, and the third switch 29 and the output switch 103 are controlled to be turned on. In addition, the bidirectional converter 104 is controlled to convert direct current from the rechargeable battery 105 into alternating current. After transformation by the transformer Tr2, required alternating current is obtained at the alternating current output end 20'. In addition, the rechargeable battery 105 supplies direct current to the control unit 107, and the AC/DC converter 106 does not work.

As can be known in combination with the foregoing operating modes, when the utility power voltage is within the normal range, the offline UPS is controlled to be in the normal mode, and after the rechargeable battery 105 is fully charged, the offline UPS is controlled to be in the DOE mode. In this case, the AVR 102 and the bidirectional converter 104 are turned off, so that the overall efficiency may be improved. The AC/DC converter 106 is controlled to supply power to the control unit 107 only in the DOE mode, and does not work in other modes. In a normal DOE mode, the rechargeable battery 105 does not supply power to the control unit 107, to avoid affecting a standby voltage of the rechargeable battery 105. In a non-DOE mode, in the battery mode, the rechargeable battery 105 supplies power to the control unit 107, and in a non-battery mode, the bidirectional converter 104 supplies power to the control unit 107.

However, when the AC/DC converter 106 is damaged due to external interference (for example, a lightning stroke), in the DOE mode, the control unit 107 acquires power from the rechargeable battery 105, and the rechargeable battery 105 is forced to supply power to the control unit 107. Because the AVR 102 and the bidirectional converter 104 are turned off in the DOE mode, the rechargeable battery 105 cannot be charged. As a result, the battery power of the rechargeable battery 105 keeps being consumed. In this case, if the offline UPS is switched to the battery mode because the utility power voltage is abnormal or for another reason, the standby duration (a duration that the rechargeable battery can support the offline UPS to supply power to the load) of the rechargeable battery 105 fails to match an actual standby duration (for example, the standby duration is shortened), and the rechargeable battery cannot provide a reliable standby duration for the load at the output end.

In the normal DOE mode, the rechargeable battery keeps standing after fully charged, and the voltage of the battery drops slowly with time. In an abnormal DOE mode, for example, the AC/DC converter 106 fails, the rechargeable battery 105 is forced to supply power to the control unit 107. In this case, the voltage of the rechargeable battery 105 drops quickly with time. In the present disclosure, the voltage of the rechargeable battery 105 is detected in real time by means of the control unit 107, and a slope of decrease in the voltage is calculated. When a slope K_bat of decrease in the voltage of the rechargeable battery 105 is greater than a preset slope threshold K_thr, it is considered that the DOE mode fails. The control unit 107 controls the offline UPS to delete the DOE mode. That is, the AVR 102 and the bidirectional converter 104 are turned on, the AC/DC converter 106 is turned off, a DOE function is disabled (for example, the DOE function is deleted in software), and a DOE mode failure is saved in a historical record.

The preset slope threshold K_thr may be set according to experience or may be measured according to experiments. A method for measuring the slope threshold K_thr in an experiment is provided below with reference to FIG. 3.

Figure 3:
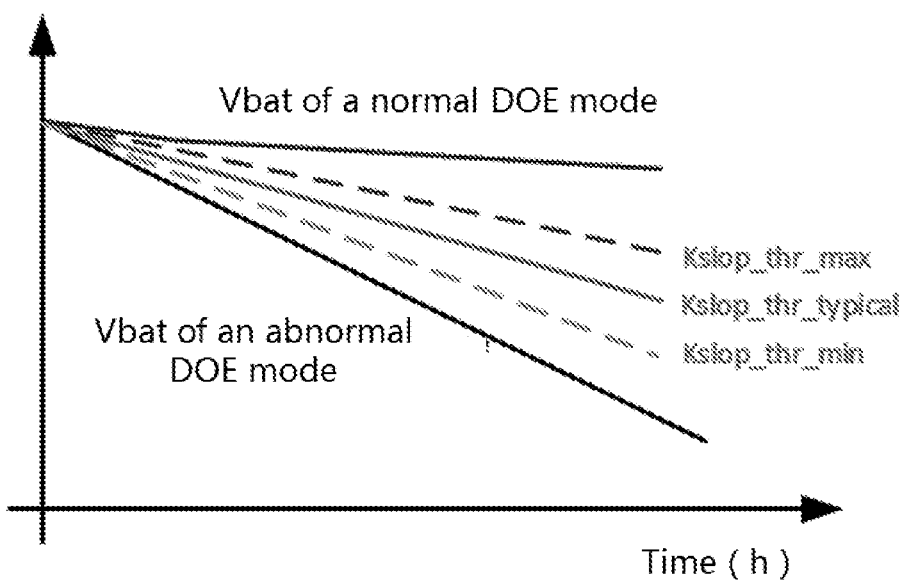
FIG. 3 shows a determined preset slope threshold according to an embodiment of the present disclosure.

At step S101, in consideration of a worst case, in the normal DOE mode, an experiment is performed with an old battery (determined according to an internal resistance in the battery); and when the offline UPS enters the DOE mode, a battery voltage is acquired once per hour, and a Vbat curve of the normal DOE mode is drawn, as shown in FIG. 3.

At step S102, in consideration of a worst case, the AC/DC converter 106 is artificially damaged to make the AC/DC converter fail (have no output) to simulate the abnormal DOE mode, and an experiment is performed with a new battery (determined according to an internal resistance in the battery); and when the offline UPS enters the DOE mode, a battery voltage is acquired once per hour, and a Vbat curve of the abnormal DOE mode is drawn, as shown in FIG. 3.

At step S103, a Kslop_thr_typical curve is initially assumed as a slope threshold for determining that the DOE mode fails; in consideration of a system error in battery voltage sampling, Monte Carlo analysis is performed on a slope threshold point of the Kslop_thr_typical curve to obtain a minimum value Kslop_thr_min and a maximum value Kslop_thr_max of the slope threshold point. If Kslop_thr_min does not interfere with the Vbat curve of the abnormal DOE mode and Kslop_thr_max does not interfere with the Vbat curve of the normal DOE mode, it is determined that the initially assumed Kslop_thr_typical curve can be used as the preset slope threshold K_thr, or otherwise it is necessary to perform assuming and determination again and repeat steps S101 to S103 until an appropriate slope threshold K_thr is obtained.

After the DOE mode fails, a remaining standby duration of the battery cannot be calculated accurately. In an actual test, after the DOE mode, the DOE mode failure is simulated by means of hardware (AC/DC converter is damaged). After the system detects that the DOE mode fails, the offline UPS is switched to the battery mode to discharge power. An actual standby duration measured in the experiment exceeds 50% of a standby duration of a fully charged battery. Therefore, during actual operation, after the DOE mode fails and a margin is reserved, the standby duration of the battery may be calibrated to be 30% of the standby duration of the fully charged battery.

Figure 4:
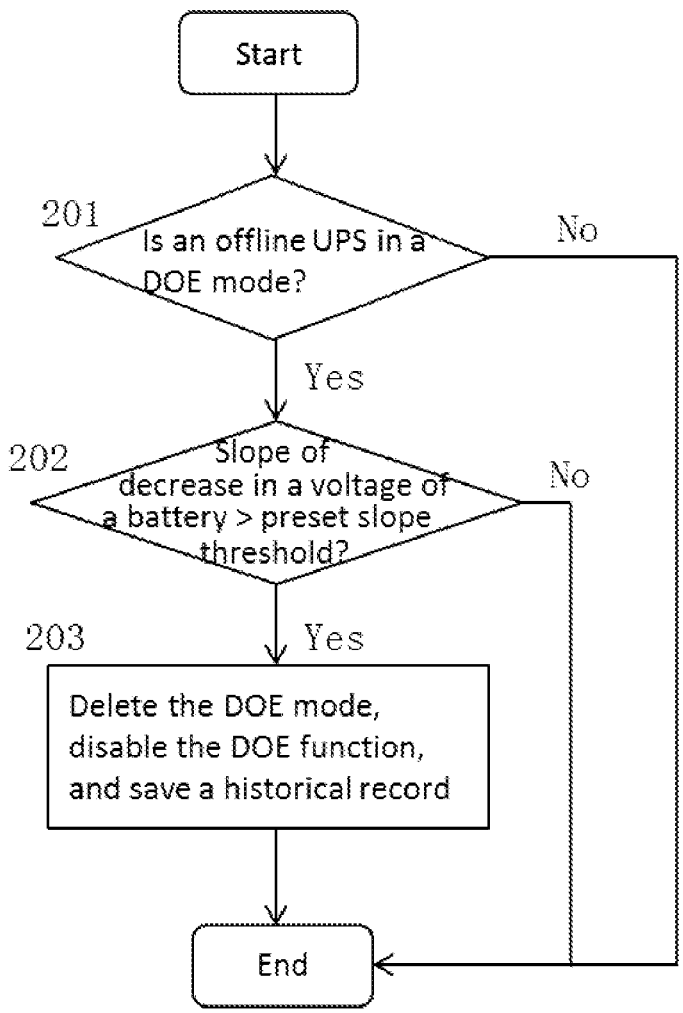
FIG. 4 is a flowchart of a DOE mode failure quick detection method according to an embodiment of the present disclosure.

The present disclosure further provides a DOE mode failure quick detection method. FIG. 4 is a flowchart of a DOE mode failure quick detection method according to an embodiment of the present disclosure. The method is described in detail with reference to FIG. 1 to FIG. 4.

At step S201, the control unit 107 detects whether the offline UPS is in the DOE mode. When the offline UPS enters the DOE mode, a DOE mode flag bit stored in a memory is set (for example, set to 1), and the control unit 107 detects the value of the DOE mode flag bit stored in the memory to determine whether the offline UPS is in the DOE mode.

At step S202, if the offline UPS is in the DOE mode, the control unit 107 detects in real time whether the slope K_bat of decrease in the voltage of the rechargeable battery 105 is greater than the preset slope threshold K_thr.

At step S203, if the slope K_bat of decrease in the voltage of the rechargeable battery 105 is greater than the preset slope threshold K_thr, the control unit 107 controls the offline UPS to delete the DOE mode, turns on the AVR and the bidirectional converter, turns off the AC/DC converter, disables the DOE function (for example, deletes the DOE function in software), and saves the DOE mode failure in the historical record.

If the offline UPS is powered off or powered up again, the DOE function may be enabled again.

According to an embodiment of the present disclosure, the control unit includes a voltage detection circuit, configured to detect the voltage of the rechargeable battery 104.

According to another embodiment of the present disclosure, the control unit is further configured to detect the voltage of the rechargeable battery 104, and when the voltage of the rechargeable battery 104 is less than a preset voltage threshold, the control unit controls the offline UPS to delete the DOE mode. However, when the method is used separately, the detection speed is slow, the display of the battery level may have jumps, and the measurement is inaccurate. According to another embodiment of the present disclosure, the detection of the voltage of the rechargeable battery and the detection of the slope of decrease in the voltage of the rechargeable battery are combined to make the determination of a DOE mode failure more accurate.

For a DOE mode of an offline UPS, the present disclosure provides a DOE mode failure quick detection system and method. In the DOE mode, a control unit detects in real time whether a slope of decrease in a voltage of a rechargeable battery is greater than a preset slope threshold. When the slope of decrease in the voltage of the rechargeable battery is greater than the preset slope threshold, the control unit controls the offline UPS to delete the DOE mode, to avoid an electric energy loss of the rechargeable battery. The method does not require an additional hardware circuit, requires low costs, and can quickly detect a DOE mode failure, to provide a reliable standby duration for a backstage load.

Although the present disclosure has been described by way of preferred embodiments, the present disclosure is not limited to the embodiments described herein, but includes various changes as well as variations made without departing from the scope of the present disclosure.

What is claimed is:

1. An offline uninterruptible power supply (UPS), comprising:
   a transformer that outputs a utility power voltage to a load;
   a bidirectional converter that converts alternating current from the transformer into direct current to charge a rechargeable battery, and converts direct current from the rechargeable battery into alternating current to be output to the transformer; and
   a control unit that controls operation of the offline UPS,
   wherein responsive to the utility power voltage being within a normal range and the rechargeable battery being fully charged, the offline UPS enters a design of energy (DOE) mode;
   wherein in the DOE mode, the transformer and the bidirectional converter are turned off; and
   wherein in the DOE mode, the control unit detects a voltage of the rechargeable battery, and calculates a slope of decrease in the voltage of the rechargeable battery; and
   wherein responsive to the slope of decrease in the voltage being greater than a preset first threshold, the control unit controls the offline UPS to delete the DOE mode.

2. The offline UPS of claim 1, wherein the offline UPS further comprises an AC/DC converter that converts the utility power voltage into direct current to supply power to the control unit in the DOE mode.

3. The offline UPS of claim 1, wherein the offline UPS further comprises the rechargeable battery within a housing thereof.

4. The offline UPS of claim 1, wherein the transformer further comprises a control component, and in response to the utility power voltage deviating from a normal value, different taps of the transformer are controlled by the control component to be connected or disconnected, to implement a constant voltage output to the load.

5. The offline UPS of claim 1, wherein the control unit further detects the voltage of the rechargeable battery, and in response to the voltage of the rechargeable battery being less than a preset second threshold, the control unit controls the offline UPS to delete the DOE mode.

6. A design of energy (DOE) mode failure detection method for an offline uninterruptible power supply (UPS), the offline UPS having a DOE mode, the method comprising:
   responsive to a control unit detecting that the offline UPS is in the DOE mode, detecting, by the control unit, whether a slope of decrease in a voltage of a rechargeable battery is greater than a preset first threshold; and
   responsive to the slope of decrease in the voltage of the rechargeable battery being greater than the preset first threshold, controlling, by the control unit, the offline UPS to delete the DOE mode.

7. The DOE mode failure detection method for an offline UPS of claim 6, wherein responsive to the offline UPS entering the DOE mode, a DOE mode flag bit stored in a memory is set, and the control unit detects a value of the DOE mode flag bit stored in the memory to determine whether the offline UPS is in the DOE mode.

8. The DOE mode failure detection method for an offline UPS of claim 6, wherein deleting the DOE mode by the offline UPS comprises:
   controlling, by the control unit, turning on a transformer and a bidirectional converter in the offline UPS, turning off an AC/DC converter, disabling a DOE function, and saving a DOE mode failure in a historical record.

9. The DOE mode failure detection method for an offline UPS of claim 8, wherein the method further comprises:
   after the offline UPS is powered off or powered up again, reenabling the DOE function.

10. The DOE mode failure detection method for an offline UPS of claim 6, wherein the method further comprises:
    responsive to the slope of decrease in the voltage of the rechargeable battery being greater than the preset first threshold, recalibrating a standby duration of the rechargeable battery.

* * * * *